(12) United States Patent  
Kirschner

(10) Patent No.: US 6,648,278 B1  
(45) Date of Patent: Nov. 18, 2003

(54) OFFSET HANGER

(75) Inventor: Kraig A. Kirschner, Corona, CA (US)

(73) Assignee: Automatic Fire Control, Incorporated, South El Monte, CA (US)

( * ) Notice: Subject to any disclaimer, the term of this patent is extended or adjusted under 35 U.S.C. 154(b) by 0 days.

(21) Appl. No.: 09/809,647

(22) Filed: Mar. 15, 2001

(51) Int. Cl.[7] .............................. E21F 17/02; F16L 3/00
(52) U.S. Cl. ........................... 248/62; 248/58; 248/74.1
(58) Field of Search .............................. 248/58, 60, 62, 248/71, 74.2, 74.3, 903, 59, 49, 68.1, 300, 230.4, 74.1; 411/175; 52/712, 715; 403/398, 191

(56) References Cited

U.S. PATENT DOCUMENTS

| | | | | |
|---|---|---|---|---|
| 844,494 | A | * 2/1907 | Best | 122/510 |
| 948,902 | A | * 2/1910 | Noyes | |
| 1,732,483 | A | * 10/1929 | Rachlin | 248/74.5 |
| 1,896,898 | A | * 2/1933 | Hildebrand | 248/228.4 |
| 1,964,770 | A | * 7/1934 | Runge | 384/440 |
| 2,981,513 | A | * 4/1961 | Brown | 248/73 |
| 3,615,110 | A | * 10/1971 | Fugate | 403/230 |
| 3,802,655 | A | * 4/1974 | Schuplin | 248/74.1 |
| 4,991,801 | A | * 2/1991 | Trumbull | 248/74.2 |
| 5,740,994 | A | * 4/1998 | Laughlin | 248/68.1 |

FOREIGN PATENT DOCUMENTS

| | | | |
|---|---|---|---|
| AU | 283666 | * 12/1966 | 248/74.1 |
| DE | 2226139 | * 12/1972 | 248/74.1 |
| GB | 116748 | * 6/1918 | |
| GB | 300769 | * 11/1928 | 248/74.1 |
| IT | 549183 | * 6/1957 | 248/74.1 |

OTHER PUBLICATIONS

Afcon #514—Offset—C.P.V.C. Hanger/Restrainer (1 pg.).
Erico—#S.O.—C.P.V.C. Pipe Hanger Offset (1 pg.).
Erico brochure *Stand–Off 2–Hole Strap Hanger* For CPVC Fire Protection Piping (1 page).
Tolco Incorporated "Stand–Off" Hanger/Restrainer for CPVC Plastic Pipe (Fig. 27 & 27A)(1 page).

* cited by examiner

*Primary Examiner*—Gwendolyn Baxter
(74) *Attorney, Agent, or Firm*—Fulbright & Jaworski L.L.P.

(57) ABSTRACT

An offset hanger which is integrally formed form metal sheet includes two mounting flanges for attachment to a supporting structure, legs extending from the mounting flanges and a cylindrically shaped retainer fixed to the legs. The retainer defines a sector of a cylinder greater than 180°. The legs diverge from one another from the retainer and include longitudinally extending ribs with side flanges. The ribs are channel shaped in cross section and extend from the mounting flange to a tangent with the retainer. The sides of the channel shaped ribs are substantially triangular.

5 Claims, 1 Drawing Sheet

OFFSET HANGER

BACKGROUND OF THE INVENTION

The field of the present invention is directed to construction hardware for the mounting of utilities.

Building structures frequently require the mounting of conduit, pipe and miscellaneous architectural, decorative and mechanical devices thereto. To do so, a wide variety of brackets and other hardware have been developed. Such hardware is frequently, if not universally the subject of building code requirements, UL specifications and the like. Offset hangers have been employed for the mounting of pipe and conduit to a wall with spacing between the mounted element and the wall. Naturally, cantilevered forces are applied to such hardware. With such applications, it is advantageous to have structurally rigid and easily mounted hangers to secure utilities within a structure.

SUMMARY OF THE INVENTION

The present invention is directed to an offset hanger which is integrally formed from a metal sheet. The resulting formed product includes a retainer portion having a wall defining a sector of a cylinder. This sector is greater than 180° to maintain a pipe or conduit enclosed therein. Two legs extend from the retainer with two mounting flanges extending laterally from the other end of the legs. Each leg has a longitudinally extending rib which is channel shaped in cross section. The deepest-most portion of the channel shaped rib extends tangentially to the retainer wall and to the mounting flanges. The unitary construction provides significant cantilever strength without requiring component assembly. Substantial side webs on the channel shaped ribs, flared edges on the retainer and a conventional attachment system may also be provided as advantageous features associated with the present invention.

Accordingly, it is an object of the present invention to provide improved offset hangers. Other and further objects and advantages will appear hereinafter.

DETAILED DESCRIPTION OF THE PREFERRED EMBODIMENT

Turning in detail to the figures, an offset hanger 10 is illustrated. The hanger 10 is integrally formed from a metal sheet. Such integral formation increases rigidity, avoids assembly issues and constrains costs. Various features will be described separately for convenience of disclosure in spite of the integral nature of the hanger.

A retainer 12 forms the central portion of the hanger 10 with a wall 14 defining a circular opening for receiving a pipe or conduit. As the wall does not extend fully about the defined circle, it defines a sector of a cylinder. This sector is greater than 180° in order to keep the captured pipe or conduit extending through the hanger 10 constrained at a fixed offset from the mounting structure. The edges of the sector are flared radially outwardly, defining flanges 16 and 18. The flared radially outward edges contribute some rigidity to the hanger. Additionally, the bracket provides a smoother transition such than an inserted pipe or conduit would not be abraded at the hanger edge even with sustained vibration.

Figure 1:
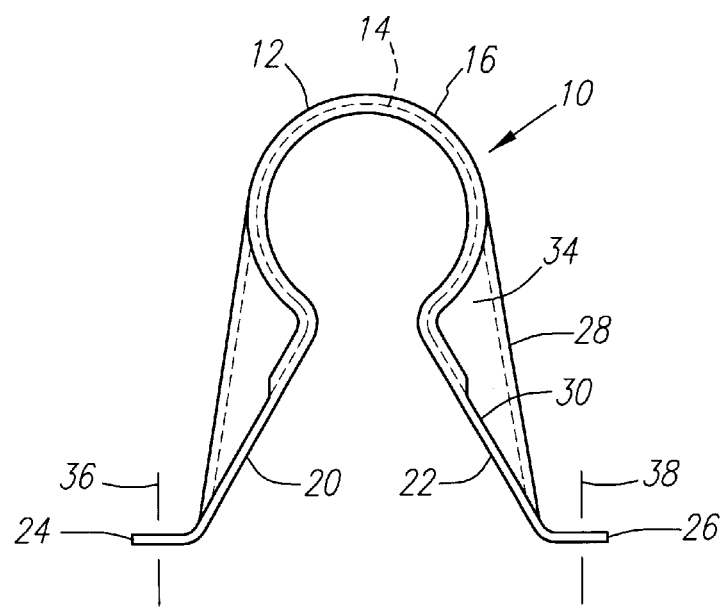
FIG. 1 is a side view of an offset hanger.
Figure 2:
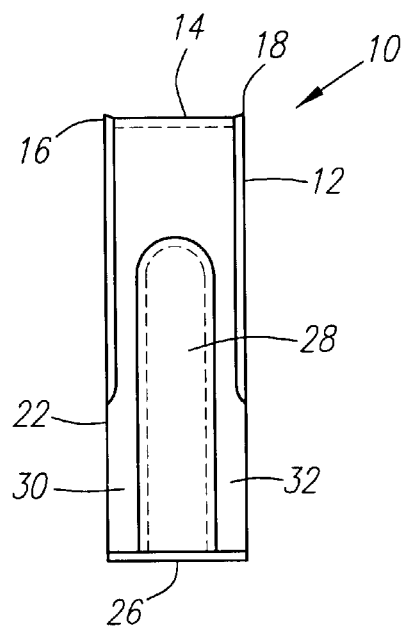
FIG. 2 is an end view of the offset hanger of FIG. 1.

The ends of the sector defined by the wall 14 meet two legs 20 and 22. The legs, in turn, extend to two mounting flanges 24 and 26. The mounting flanges 24 and 26 are at the opposite ends of the legs 20 and 22 from the ends of the sector defined by the wall 14. The two legs 20 and 22 each include a longitudinally extending rib 28. Side flanges 30 and 32 extend laterally from either side of the rib 28 on each of the legs 20 and 22. The rib is channel shaped in cross section with the concavities of each channel facing toward one another. The deepest-most element of the channel forms the outermost element of the rib on each of the legs 20 and 22. These elements extend in a straight line from the mounting flanges 24 and 26 to the retainer 12 where a tangent is created with the wall 14. The sides 34 of the channels extend inwardly to an intersection with the wall 14 and with the side flanges 30 and 32 as can best be seen in FIG. 1. Because the wall extends as a sector through greater than 180°, it extends inwardly to meet the legs. Further, the legs diverge from one another as they depart from the retainer. As a result, the sides 34 are substantially triangular in plan. The integrally formed ribs having a straight outer element and the triangular sides provide great rigidity against bending.

The two mounting flanges 24 and 26 located at the base of the ribs 28 extend laterally from the two legs 20 and 22. These flanges 24 and 26 lie substantially in a plane as they are most commonly to be bolted onto a planar surface. Mounting holes, indicated by centerlines 36 and 38 in FIG. 1 accommodate fasteners for rigid attachment to the supporting structure.

Thus, an improved offset hanger is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An offset hanger comprising
an integrally formed metal sheet including
a retainer having a wall defining a sector of a cylinder greater than 180°,
two legs extending from the ends of the sector, respectively;
two mounting flanges extending laterally from the two legs, respectively, at the ends of the legs most distant from the retainer, each leg having a longitudinally extending rib and side flanges extending laterally from either side of the rib, the rib being channel shaped in cross section with a deepest-most element of the rib extending from the mounting flange to tangent with the wall of the retainer, the sides of the ribs being substantially triangular.

2. The offset hanger of claim 1, the legs diverging from one another from the retainer.

3. The offset hanger of claim 1, the edges of the retainer being flared radially outwardly.

4. The offset hanger of claim 1, the two mounting flanges lying substantially in a plane and including mounting holes therethrough.

5. An offset hanger comprising
an integrally formed metal sheet including
a retainer having a wall defining a sector of a cylinder greater than 180°, the edges of the retainer being flared radially outwardly;
two legs extending from the ends of the sector, the legs diverging from one another from the retainer respectively;

two mounting flanges extending laterally from the two legs, respectively, at the ends of the legs most distant from the retainer, lying substantially in a plane and including mounting holes therethrough, each leg having a longitudinally extending rib and side flanges extending laterally from either side of the rib, the rib being channel shaped in cross section with a deepest-most element of the rib extending from the mounting flange to tangent with the wall of the retainer, the sides of the ribs substantially triangular.

* * * * *